Dec. 8, 1970     R. C. WICKER     3,545,853
GRAPHIC PROJECTOR

Filed Nov. 28, 1967     3 Sheets-Sheet 1

INVENTOR.
RALPH C. WICKER

BY

ATTORNEY

Dec. 8, 1970  R. C. WICKER  3,545,853

GRAPHIC PROJECTOR

Filed Nov. 28, 1967  3 Sheets-Sheet 3

INVENTOR.
RALPH C. WICKER.
BY
ATTORNEY

United States Patent Office 3,545,853
Patented Dec. 8, 1970

3,545,853
GRAPHIC PROJECTOR
Ralph C. Wicker, 17 Hillcrest Drive,
Fairport, N.Y. 14605
Filed Nov. 28, 1967, Ser. No. 686,237
Int. Cl. G03b 21/22
U.S. Cl. 353—78   10 Claims

ABSTRACT OF THE DISCLOSURE

Projector for use in the photographic arts for examining and correcting film comprising a flat work surface over a hollow base for supporting a film for examination, and having an inclined upwardly and forwardly projecting light tunnel housing secured to the upper rear portion of the base projecting over and above the work surface, a light beam directed downwardly toward a small transparent area in the surface, a lens and reflectors disposed below the table and on the rear wall for transmitting and enlarging a selected area of a film disposed over the transparent area and producing a greatly enlarged oriented image on a screen in the forward end of the light tunnel.

---

Figure 1:
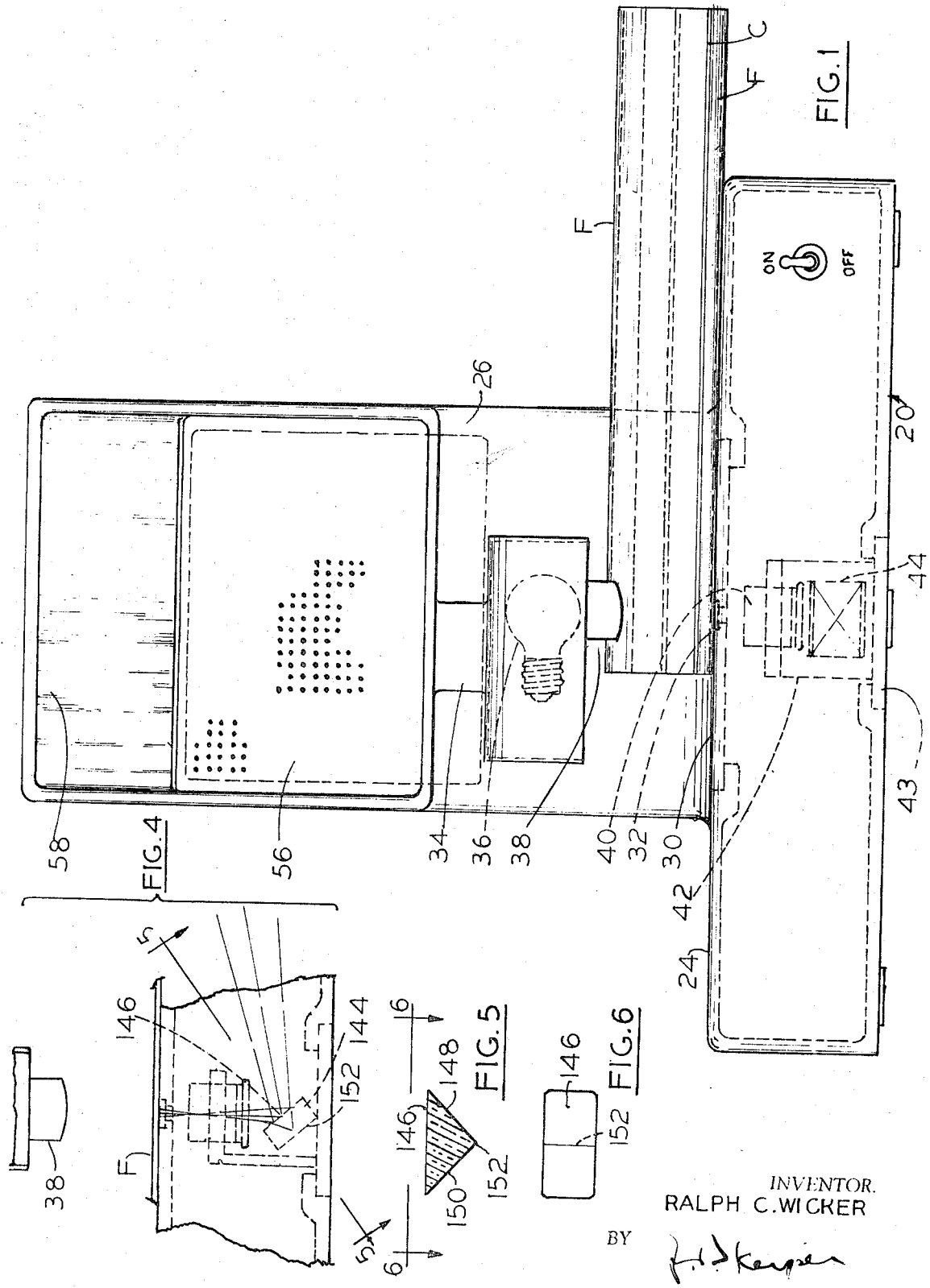

This invention relates to apparatus for facilitating inspection and correction of half tone positive and negative films in lithographic processing as well as conventional film.

During the usual lithographic process of making and preparing half tone positive and negative films, and the inspection and retouching of film in general, a normal step in the procedure is to inspect and correct the films in respect to any small breaks or spots resulting from foreign matter that would interfere with the smooth appearance of the finished picture and require touching up. For this purpose, resort to a high power viewing glass and fine pens and needles is had in the touching up process. The high power viewing lens of 10 to 20 power, when applied to a half tone film employing a dot periodicity of 150 to the inch, magnifies the dots. However, the viewing glass is closed to the work, often within an inch, and the inspector must approach the work with his instruments at an angle. In some instances a particularly area in a color half tone film may require toning down by reduction of the dot size, as though the use of a potassium ferricyanide etch applied to the emulsion side of the film. Such toning down requires close watch so that the etching may be promptly suspended upon the desired effect being reached.

The apparatus of the present invention would eliminate the use of such magnifying glasses. For this purpose, the apparatus comprises a work table having a small transparent area highly illuminated by a downwardly directed beam and over which any portion of a film may be placed for inspection. The illuminated portion of the film is projected through a lens beneath the area, and projected through a right angle prism and reflector system to a viewing screen disposed in a convenient location for observation by the operator. Through 50 power magnification, dots of 150 periodicity show up on the viewing screen with the clarity and spacing of about 5 to the inch and areas requiring touching up of any other film, whether a positive or negative is similarly magnified. The inspector while watching the screen may perform such touching up operations on the portion of the film thus rendered easy to watch. Any reduction or enlargement of the half tone dots can be watched with ease and the procedure controlled without eye strain. The smallest dots or other defects on the film may be readily seen and watched while touching up, or corrections are being made.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 2:
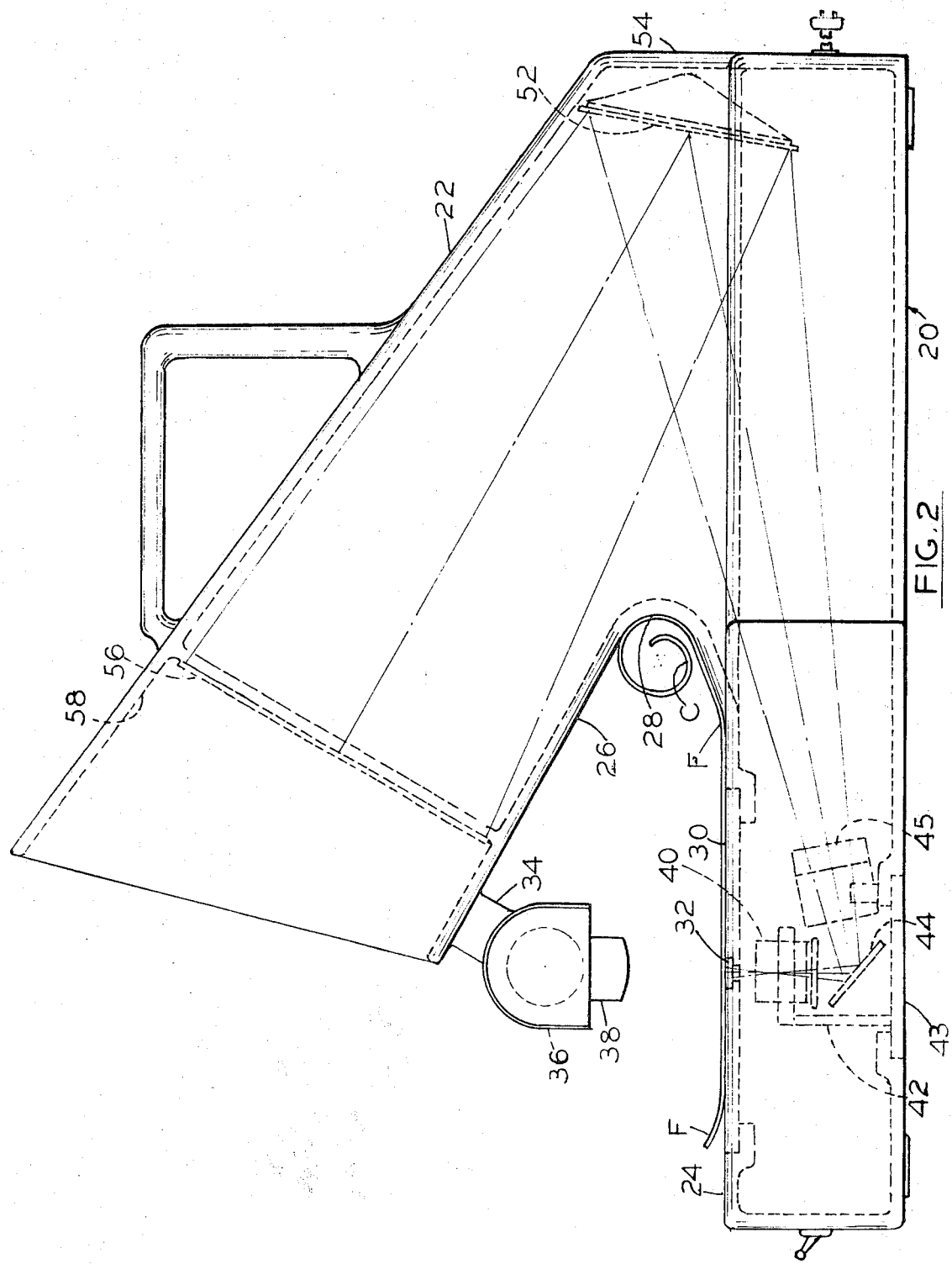
Figure 3:
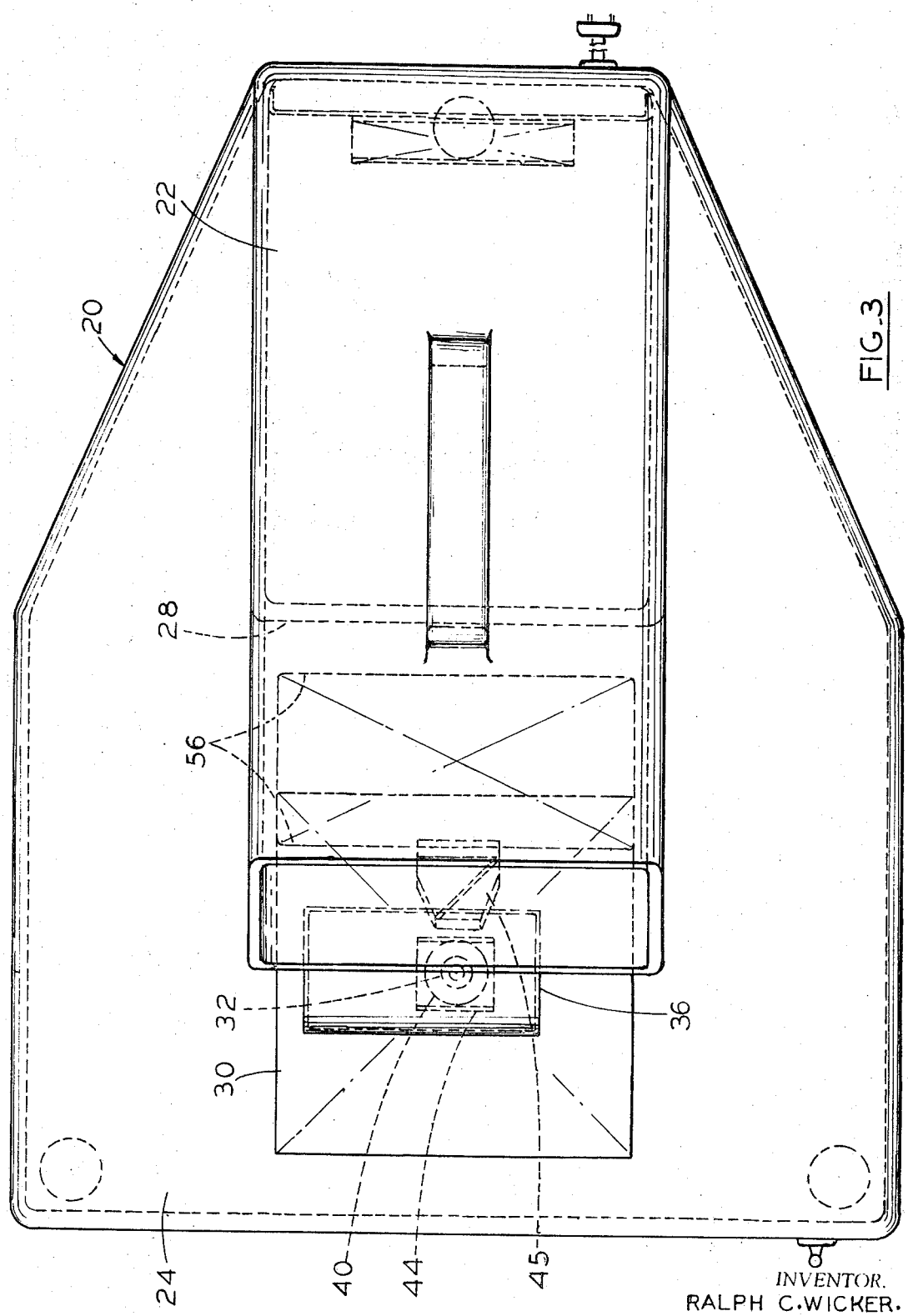

In the drawings, wherein like reference characters indicate like parts:

FIG. 1 is a front elevation of the apparatus;
FIG. 2 is a side elevation of the apparatus;
FIG. 3 is a plan view of the apparatus;
FIG. 4 is a fragmentary view of an alternative prism reflecting system;
FIG. 5 is a section taken through the prism taken on the plane 5—5 of FIG. 4, and
FIG. 6 is a plan view of the prism taken from the plane 6—6 in FIG. 5.

Referring to the drawings there is shown a relatively broad hollow base 20 having towards its rear a hollow forwardly and upwardly extending inclined light tunnel housing 22. The base is provided with a flat work table surface 24 upon which a flexible film may be placed, and the angle formed between the table surface and under surface 26 of the light tunnel is provided with a smooth cylindrical recess 28 for curling the edge C of large films F to permit examination of any part of a large or small film. The table surface 24 is provided with an insert plate 30 having a quarter inch diameter transparent area centrally located as at 32, over which any portion of a film, to be examined, may be placed.

Upon the underside 26 of the upper end of the tunnel housing 22 is a lamp bracket 34 having a high power electric lamp 36 with a condenser 38 to direct a beam downwardly toward the transparent area 32. Such light beam is adapted to illuminate a portion of a transparent film F disposed over the area 32, so that the illuminated portion may be projected through a lens 40 disposed below the area 32 upon a bracket 42 forming part of a removable base insert 43. The lens, may be of a 12 power three element type having a focal length of 13/16 inch and stopped to a diameter of 1/8 inch.

The lens 40 is disposed above a front surface reflector 44 set at about 50 degrees and the diverging reflected beam therefrom is projected through a Pechan prism erecting system 45 for changing the image from left to right without inverting it. Prisms of this sort are obtainable from the Edmund Scientific Co. of Barrington, N.J. The divergent light beam extends to a second front surface mirror reflector 52 mounted on the back wall 54 of the base and tunnel housing. Such mirror is set at an angle so as to project the diverging beam upon a ground glass or other suitable screen 56, set in the light tunnel housing on the internal rib 58 so as to provide a light shield or viewing hood 58 of the forward portion of the housing. A switch 60 is provided at a convenient location to control the current supplied to the lamp.

It will be seen from the above, that any portion of a half tone film F may be located over the transparent area 32, and illuminated by the lamp 36. The half tone dots thus illuminated will be clearly projected upon the screen 56, the magnification being such that dots of a periodicity of 150 to the inch on the film, will appear accurately enlarged and spaced about five to the inch on the screen 56. Such screen may be of the high quality resolution type of plate. An operator may thus hold the film upon the table surface with the emulsion side up, and examine any portion of it by sliding the film on the table, and when a portion is observed that requires correction or touching up, such portion will be seen on the screen 56, so magnified as to not necessitate the use of eye pieces or magnifying lenses, as was heretofor the practice. By observing the film solely as it is projected on the screen, the operator may manipulate his needle like instruments upon the film while observing the effect magnified on the screen 56. He may also, for example, tone the dot size down in a particular area through the use of potassium ferricyanide, and watch the gradual shrinkage of the dot size, so as to be able to stop the treatment when the desired correction has been made.

An alternative system for reflecting and reversing from right to left may employ a single right angle prism 144 in place of the reflector 44 and prism system 45 is illustrated in FIGS. 4, 5 and 6 wherein a prism 146 having silvered reflecting surfaces 148 and 150 intersecting along a line 152 and arranged at a 90 degree angle, is disposed with its hypotenuse surface 146 arranged at an angle of about 50 degrees from the horizontal in the modification of FIG. 4. The surface 146 is provided with an antireflection coating so that all light from the lens 40 must enter the prism and be reflected from silvered surface 150 to surface 148 or vice versa, before emerging, whereby the dual function of reflection and left to right reversal is accomplished by the single prism.

The apparatus may be used to correct and retouch and inspect any negative or positive film, made on any conventional camera or a graphic arts camera, and includes continuous tone negative and positives, and negatives having drawings or print that require inspection and retouching.

While two forms of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A projector for use in the graphic arts for examining and correcting photo film comprising a hollow base having a flat work surface adapted to support a flexible film for examination and manual correction, an inclined upwardly and forwardly projecting light tunnel housing secured to the upper rear portion of the hollow base, and communicating with the base, and projecting over and above the work table, a lamp and condenser mounted on the underside of the tunnel housing for projecting a light beam downward toward the table, said table having a small transparent area in the table in line with the beam, a lens disposed below the table in alignment with the transparent area having a focal length less than the distance between the lens and table, a screen disposed in the upper forward end of the light tunnel housing, and reflecting means for transmitting and enlarging a selected area of a film disposed upon the table and over the transparent area and producing a greatly enlarged oriented image of the selected area on said screen.

2. A projector as set forth in claim 1 wherein the work table and the underside of the exterior of the light tunnel housing are joined by a cylindrical surface of a radius to permit ready curling of a film edge portion, when thrust there against.

3. A projector as set forth in claim 1 wherein the reflection means comprises a mirror below the lens, a left to right image changing prism, and a mirror on the inside rear wall of the casing and tunnel housing.

4. A projector as set forth in claim 1 wherein the reflecting means comprises a right angle prism below the lens, which changes the image from a left to right image, and a mirror on the inside rear wall of the casing and tunnel housing.

5. A projector as set forth in claim 1 wherein the reflecting means consists of a planar reflecting mirror on the inside rear wall of the casing and tunnel housing, and a reflecting and reversing means comprising two planar intersecting reflecting surfaces disposed at right angles to each other, and at 45 degrees to a plane of symmetry in which lies the axis of said lens, the intersection line of said reflecting surfaces, the vertical center line of said reflecting mirror and the vertical center line of said screen.

6. A projector as set forth in claim 5 wherein the reflecting and reversing means comprises a prism having intersecting silvered reflecting surfaces and a hypotenuse planar surface having an anti-reflecting coatiing disposed at right angles to said plane of symmetry.

7. A projector in accordance with claim 1 wherein the lens is stopped to a diameter of ⅛ inch.

8. A projector in accordance with claim 4 wherein the lens is stopped to a diameter of ⅛ inch.

9. A projector in accordance with claim 5 wherein the lens is stopped to a diameter of ⅛ inch.

10. A projector in accordance with claim 6 wherein the lens is stopped to a diameter of ⅛ inch.

References Cited

UNITED STATES PATENTS

| 2,551,482 | 5/1951 | Wolk | 353—75 |
| 2,569,918 | 10/1951 | Berggren | 353—78 |
| 2,578,106 | 12/1951 | Taylor | 353—97 |
| 3,180,207 | 4/1965 | Herrmann | 353—78 |

FOREIGN PATENTS

| 416,022 | 11/1946 | Italy | 353—78 |

OTHER REFERENCES

Military Standardization Handbook, Optical Design, MIL-HDBK-141, Oct. 5, 1962, p. 13-36.

SAMUEL S. MATTHEWS, Primary Examiner

U.S. Cl. X.R.

353—81